UNITED STATES PATENT OFFICE.

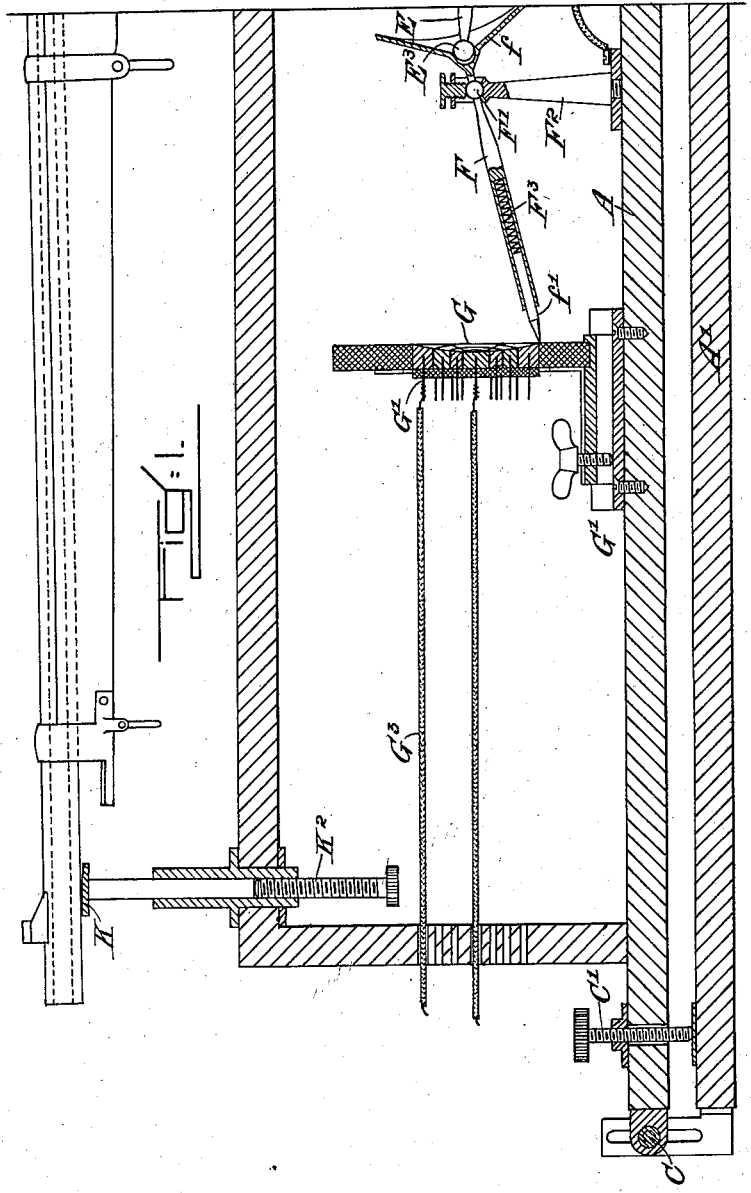

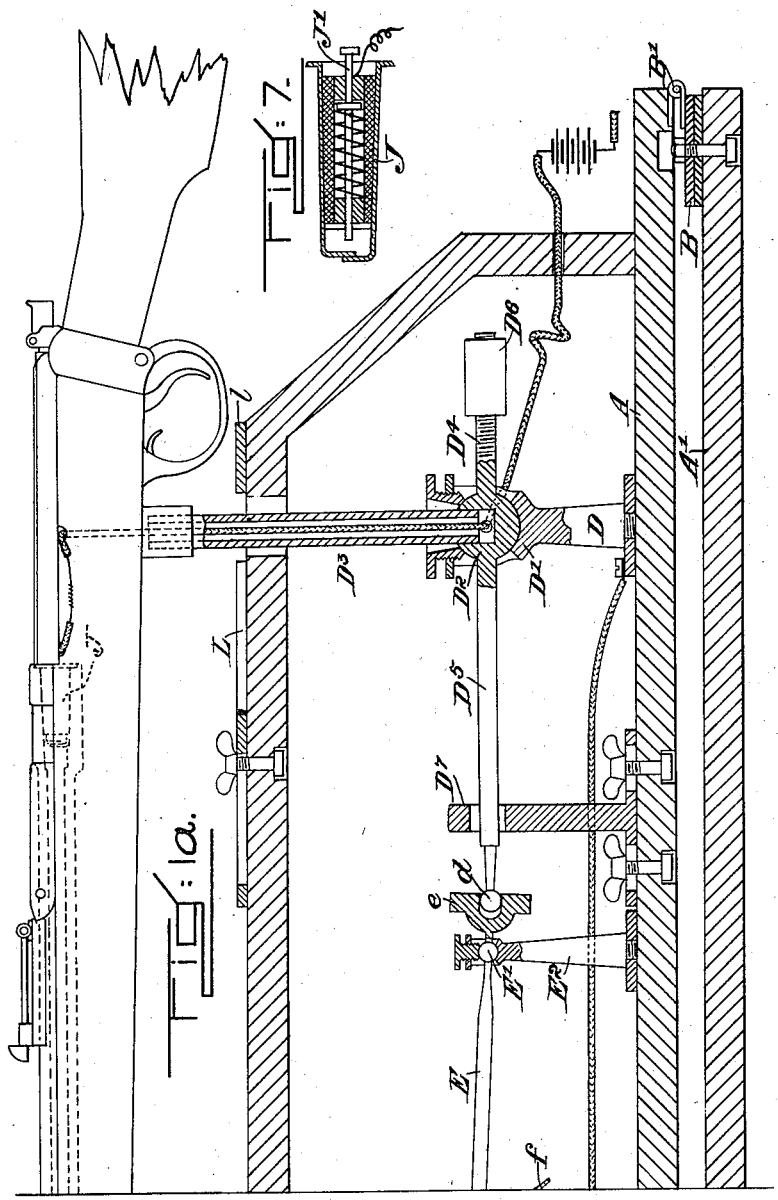

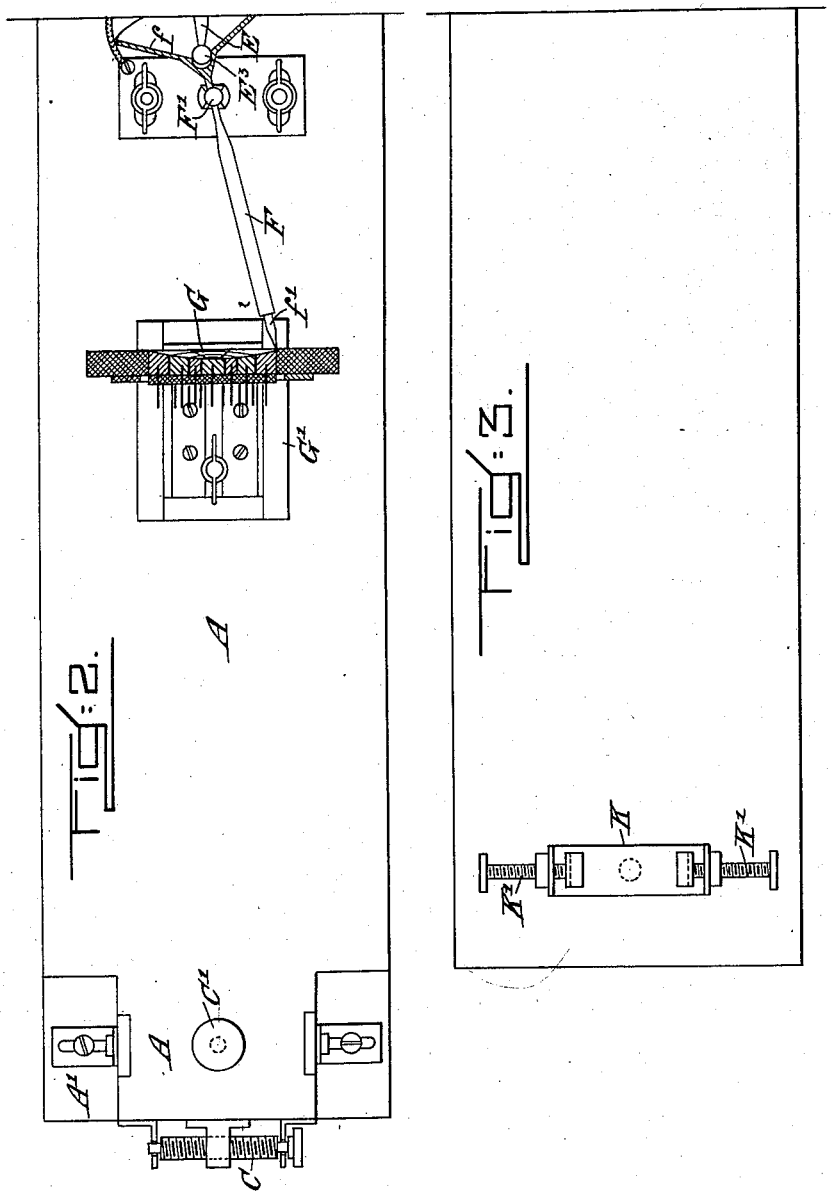

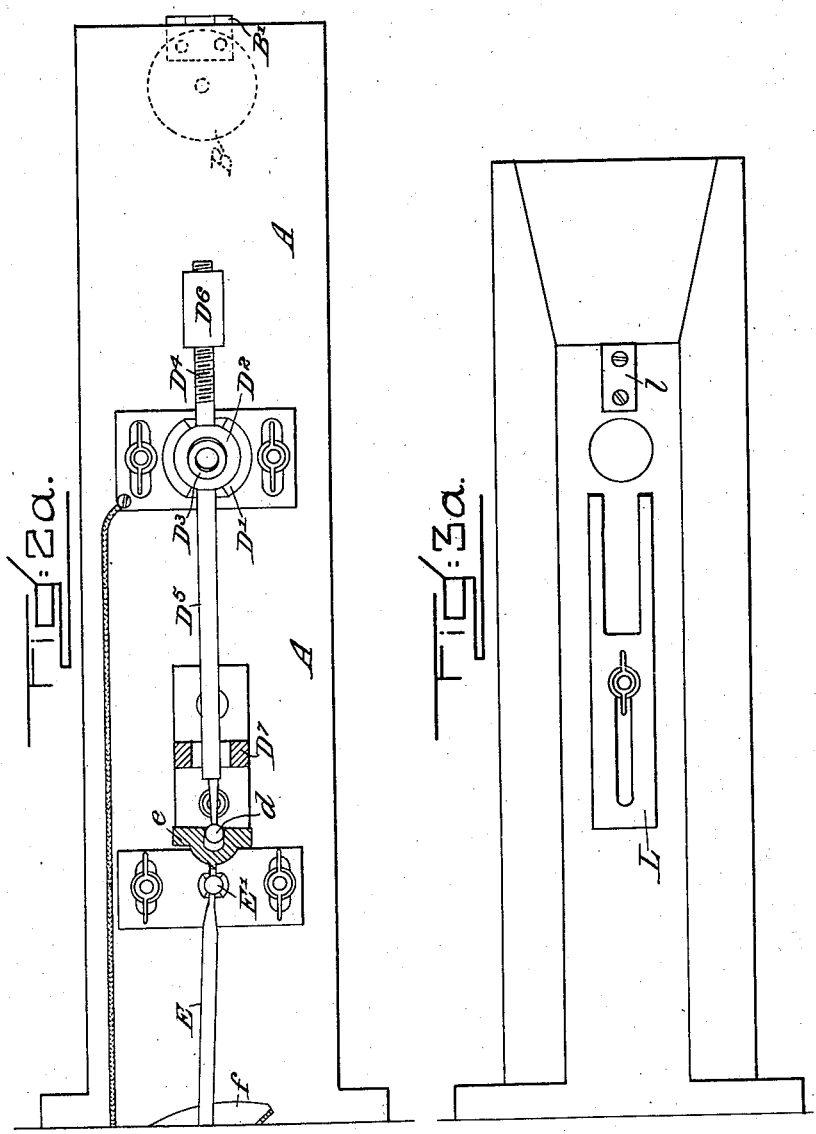

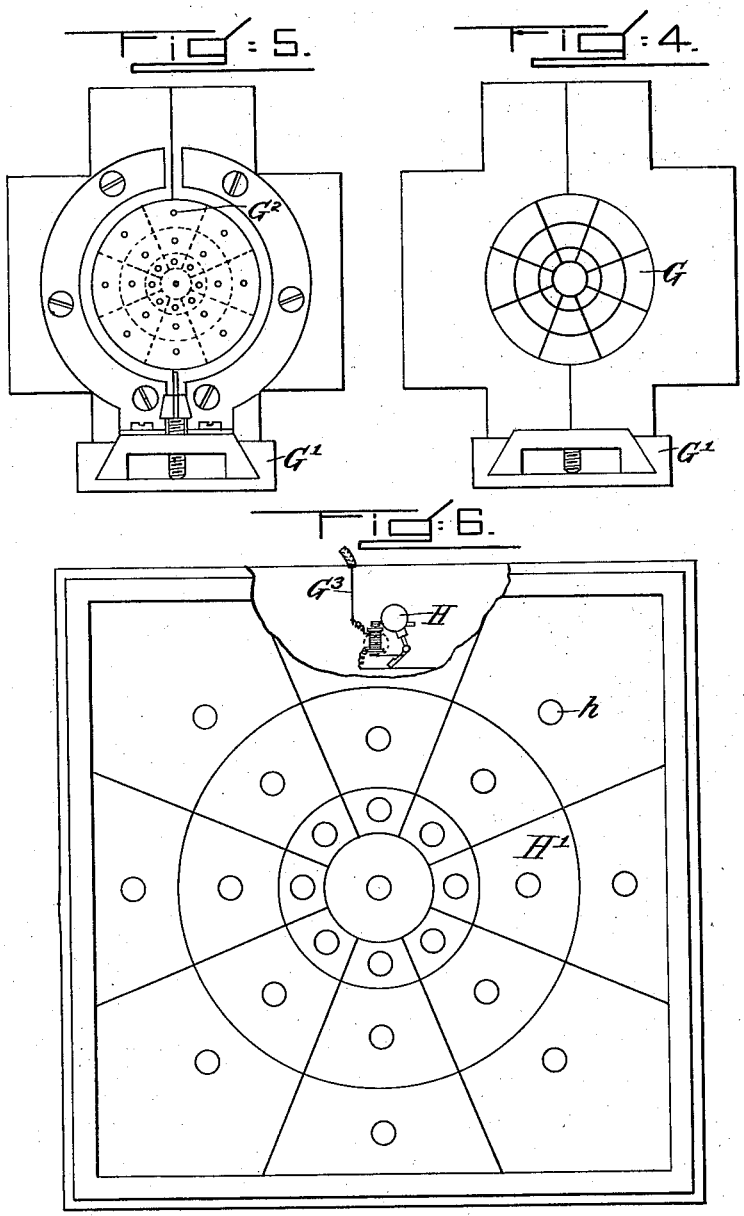

CLEMENT WILLIAM WEDGWOOD, OF ROSEVILLE, NEW SOUTH WALES, AUSTRALIA.

INDICATING APPARATUS TO ASSIST IN TEACHING ACCURATE SHOOTING AT A TARGET.

1,217,376.

Specification of Letters Patent.

Patented Feb. 27, 1917.

Application filed January 24, 1916. Serial No. 73,817.

*To all whom it may concern:*

Be it known that I, CLEMENT WILLIAM WEDGWOOD, a subject of the King of Great Britain and Ireland, residing at Walthamstow, Victoria street, Roseville, New South Wales, Australia, have invented new and useful Improvements in Indicating Apparatus to Assist in Teaching Accurate Shooting at a Target, of which the following is a specification.

Many tyros, while passing through a course of musketry, are unable to understand why they are not more successful in hitting the bull's-eye, nor are their instructors in a better position to diagnose the true causes of failure in the efforts of their pupils. The apparatus which forms the subject of the present application will indicate, prior to the trigger of the rifle being pulled, the exact position on the target against which the barrel of the rifle is directed, any error in aiming being thereby susceptible to correction. It will also record upon a duplicate target at the marksman's end of the range the exact position where the bullet should strike the target at the other end of the range.

In order that the invention may be thoroughly understood, reference will be made to the accompanying sheets of drawings, in which:—

Figures 1 and 1ª, Sheets I and II, are a side elevation of the rifle, the apparatus below being shown in longitudinal vertical section.

Figs. 2 and 2ª, Sheets III and IV, are a sectional plan of the same.

Figs. 3 and 3ª, Sheets III and IV, are a plan of the casing that covers the centering apparatus.

Fig. 4, Sheet V, is a view of the face of the miniature target.

Fig. 5, Sheet V, is a back view of the same.

Fig. 6, Sheet V, is a view of the face of the registering target, with a small part broken away to show the shutter behind.

Fig. 7 is a longitudinal section through the non-explosive cartridge.

A is the base plate which is carried by an underplate $A^1$; at the rear end of the underplate $A^1$ is a turntable B, similar in all its main features to the turntable on the undercarriage of an ordinary road vehicle. To the upper member of the turntable and to the base plate A is attached a hinge $B^1$; the turntable B enables the base plate A to operate in a horizontal plane; the hinge $B^1$ enables the base plate A to operate in a vertical plane. The horizontal movements of the base plate A will be regulated by the screw C (Fig. 2, Sheet IV), while the vertical movements of the base plate A will be regulated by the screw $C^1$ (Fig. 1ª, Sheet II). A standard D is placed near the hinged end of the base plate A, its upper end being formed as a cup $D^1$, to receive a ball $D^2$, from which rises a hollow stem $D^3$, which supports the stock of the rifle; there are also rearward and forward extensions of the ball $D^2$, the same being marked, respectively, $D^4$, $D^5$, the extension $D^4$ being counterweighted at $D^6$, so that the forward extension $D^5$ may be properly balanced. The extreme forward end of $D^5$ terminates in a ball $d$, which engages with a recess in a weighted socket-piece $e$. The shaft $D^5$ passes through a circular hole in a plate $D^7$, that rises from the base plate A, whereby its movement in any direction shall be strictly limited. The weighted socket-piece $e$ is the terminal of a lever E, the fulcrum of which is a ball $E^1$, working in a socket carried by the standard $E^2$, situated near the center of the base plate A. The forward end of this lever E terminates in a ball $E^3$, that engages with a socket in the center of a dished disk $f$, which is the rear terminal of a lever-pointer F, the fulcrum of which is a ball $F^1$, that works in a socket carried by a standard $F^2$, situated at the forward end of the base plate A. The lever pointer F is telescopic, and contains a helical spring $F^3$, that is adapted to thrust forward the extreme point $f^1$, and maintain it in contact with the metallic face of the miniature target G, which is a concave disk, which is divided into insulated segments representing segments of the range target at which the rifle barrel is directed. The system of levers is for the purpose of magnifying the small movement of the rifle through the stem $D^3$, so that the tip of the pointer F will be able to reach every part of the miniature target. This miniature target is susceptible to horizontal adjustment on the base $G^1$, according to the length of the range which is being fired over. Each segment of the miniature target is insulated, and will be provided with a forwardly projecting metal pin or terminal, $G^2$, which, through the wires $G^3$, will be in electrical connection with the shutters H attached to corresponding segments of a registering target H¹ that will be placed in a position near by. The shutters H will be visible through circular apertures $h$, in the face of the recording target.

A dummy, non-explosive cartridge J, a longitudinal section of which is shown at Fig. 7, Sheet 2, is inserted into the breech of the rifle, and the breech closed. When the trigger is pulled, the striker will force in an insulated pin J¹, that is located axially within the cartridge J, causing the pin J¹ to make contact with the metallic end of the dummy cartridge, whence the electric current will pass through the metal of the rifle barrel, through the hollow stem D³, that supports the rifle, to the base of the first standard D, thence, by wire, to the base of the third standard F², and thence, through the telescopic pointer F, to one or other of the metallic segments of the miniature target G, thence through the metallic face of that segment, and its terminal behind, to the shutter connected to the corresponding segment of the registering target H¹, thus registering the segment of the range target at which the rifle was sighted at the moment when the trigger was pulled.

Should the pointer F be clear of the face of the miniature target, there will be no effect on the registering target, because metallic contact will have been broken between the pointer and the miniature target.

When the rifle is to be set so that it may coöperate properly with the apparatus, the base plate A will be placed approximately in a line with the range target; the hollow stem that supports the stock of the rifle will be secured against lateral movement by thrusting the slide L toward the rear so that its forked end shall embrace the hollow stem D³, while the extreme ends of the fork shall engage with the small plate $l$, thus preventing any lateral movement of the slide L. The muzzle end of the rifle will lie upon a T-piece K, upon which are mounted clamps K¹, that are adapted to grip the barrel. The T-piece K will be raised vertically by screwing up the screw K² until the bore of the rifle is parallel with a line below, on the same horizontal plane as the center of the miniature target. The muzzle of the rifle will then be moved along the T-piece until the pointer shows that the bore of the rifle is vertically above and parallel with the axial line of the system of levers, that passes through the center of the bull's-eye of the miniature target; the muzzle of the rifle may be clamped upon the T-piece; the rifle will then be set in relation to the indicating and recording apparatus. It will be further necessary to adjust the base plate so that the rifle sights shall be made to cover the center of the range target; but this will not affect the indicating and registering apparatus, because the rifle and the indicating apparatus will be moved as one. The last adjustment will be effected by manipulating the adjusting screws C, C¹, as hereinbefore mentioned. The muzzle of the rifle may then be released from the grip of the clamps K¹, and the T-piece lowered by unscrewing the screw K². The rifle will then be ready for the pupil to take aim at the range target, but he will have to depend entirely upon himself for his aim, because the only point where the rifle is in any way supported is at the hollow stem, and this point of connection is necessary in order to establish communication between the rifle and the apparatus below, where the slightest erratic movement of the rifle, due to the movements, voluntary or involuntary, of the marksman, may be observed in the eccentric movements of the pointer relative to the miniature target.

I claim:

1. In apparatus for teaching rifle shooting at a target, in combination, a fixed base plate, a movable base plate, secured to the rear end of the fixed base plate, such movable plate being adapted to be moved, to a limited extent, in horizontal and vertical planes, a pillar rising from the movable base plate, such pillar having a ball socket at its upper end, a ball in the socket, a stem rising vertically from the ball to support the rifle, a stem projecting from the front and the rear of the ball, such stem being counterbalanced, and a system of levers connected with the forwardly projecting stem, such system of levers terminating in a telescopic spring pointer that is in a metallic contact with the concave face of a miniature target.

2. In apparatus for teaching rifle shooting at a target, in combination, a base plate adapted to be moved to a limited extent in horizontal and in vertical planes, a pillar rising therefrom, such pillar terminating at its upper end in a ball socket, a ball in the socket, a stem rising from the ball to support the rifle, a stem projecting from the front of and counterbalanced at the rear of the ball, a second pillar terminating in a ball socket, a lever arm working with a ball in the socket, a counterweight projecting from the ball engaging with the forward end of the stem behind it, while the forward end is engaged with a dished disk on the rear end of a telescopic spring pointer, and a miniature target with a concave face divided into sections, the telescopic pointer being in metallic contact with the concave face of the target, and electrical means for connecting the sections of the miniature target with corresponding sections of a recording target, whereby the section of the miniature target with which the pointer is in contact at the moment when the trigger is pulled shall be indicated on the face of the recording target.

3. In apparatus for teaching rifle shooting, at a target, in combination, a dummy cartridge consisting of a metallic shell, an axially situated spring firing pin laterally insulated from the shell and so arranged that electric contact shall only be made between the firing pin and the forward end of the metallic cartridge when the pin is struck by the hammer of the rifle, and electric means for connecting the metallic cartridge with the miniature target and with the recording target, the electric current passing through the pin, the cartridge, the barrel of the rifle, the stem that supports the rifle, the pillars carrying the system of levers connecting the rifle with the pointer, through the pointer to a section on the concave face of the miniature target and thence to a recording target.

In testimony whereof I have signed my name to this specification in the presence of two subscribing witnesses.

CLEMENT WILLIAM WEDGWOOD.

Witnesses:
R. MEASSER,
H. C. CAMPBELL.